UNITED STATES PATENT OFFICE.

THOMAS J. FAY, OF BROOKLYN, NEW YORK, ASSIGNOR, BY MESNE ASSIGNMENTS, TO THE STANDARD PARTS COMPANY, OF CLEVELAND, OHIO, A CORPORATION OF OHIO.

LUBRICATING COMPOUND.

1,309,618.  Specification of Letters Patent.  Patented July 15, 1919.

No Drawing.  Application filed October 4, 1915.  Serial No. 53,929.

*To all whom it may concern:*

Be it known that I, THOMAS J. FAY, a citizen of the United States, residing at Brooklyn, in the county of Kings and State of New York, have invented a certain new and useful Improvement in Lubricating Compounds, of which the following is a full, clear, and exact description.

This invention relates to compositions of matter, and more particularly to a composition that is particularly designed for use where lubrication is to be effected in the presence of heat; as, for instance, in the case of valves for and pistons of internal combustion engines. While capable of other applications, the lubricant is particularly efficient in connection with and as applied to sliding sleeve valves having grooves in the exterior surface thereof, such as shown in the application of Christian Girl No. 827,789 filed March 28, 1914.

In producing my composition of matter, I first prepare a self-hardening cement consisting of lead oxid (PbO) having added thereto anhydrous glycerin in sufficient quantity to produce a self-hardening cement of glycerate of lead. The glycerin will be added in small quantities, from time to time, until the proper degree of plasticity is secured. Then, before the cement is "set" and hardened through the heat evolved from the chemical combination, I add thereto about an equal amount by weight of graphite, mixing the graphite intimately with the plastic compound. This amount of graphite is substantially the proper amount to enter and fill the voids or pores in the cement. This mixture, while still in a plastic or semi-plastic condition, will be applied to the grooves of the valves or pistons.

The composition described has proven extremely efficient, and especially so in connection with the sliding sleeve valves of internal combustion engines. In the operation of these valves (as well as in the operation of pistons) more or less carbon will be deposited upon the outer surfaces thereof. This carbon can enter the grooves and make good the deficiency of carbon therein which occurs through the operation of the valves. In other words, I am enabled to provide a self-renewing and self-perpetuating lubricant, which will last indefinitely; and thus I am enabled to dispense with the use of any special supplying means or connections for introducing the lubricant into the valve grooves. Furthermore, should any foreign substance (such as silica from dust entering the intake) be deposited upon the outer surfaces of the sleeves, this foreign substance will be carried into the grooves before it will have a chance to form a hardened cement that will serve to scratch or deface the valve surfaces and will be retained in such grooves in a harmless condition.

Having thus described my invention, what I claim is:—

1. A composition of matter for the purpose specified containing graphite and glycerate of lead.

2. A composition of matter for the purpose specified containing graphite having glycerate of lead mixed therewith in about the proportions specified.

3. A composition of matter for the purpose specified comprising PbO and glycerin mixed to produce a plastic self-hardening cement and such cement being mixed while plastic with graphite in about the proportion of one to one.

4. A composition of matter for the purpose specified comprising PbO and glycerin mixed in proportions to produce a self-hardening cement and having added thereto, prior to hardening, substantially an equal amount of graphite mixed therewith and filling the voids in the cement.

5. A composition of matter for the purpose specified comprising a self-hardening cement having applied thereto, while in a plastic or semi-plastic condition, a substantially equal amount of graphite mixed with the cement and substantially filling the voids therein.

6. A composition of matter for the purpose specified consisting of a plastic self-hardening cement of glycerin and PbO having a pore filling lubricating medium incorporated therewith in about the proportions specified while the cement is in a plastic condition.

In testimony whereof, I hereunto affix my signature in the presence of two witnesses.

THOMAS J. FAY.

Witnesses:
H. S. JANDERS,
H. W. STEINER.